(12) United States Patent
Messager et al.

(10) Patent No.: US 7,769,157 B2
(45) Date of Patent: Aug. 3, 2010

(54) METHOD OF PROVIDING THE FACILITY FOR SOME COMMUNICATION NETWORK USERS TO HAVE PREFERENTIAL ACCESS FOR PARTICULAR CALLS

(75) Inventors: André Messager, Choisy le Roi (FR); Cao Thanh Phan, Raleigh, NC (US)

(73) Assignee: Alcatel, Paris (FR)

( * ) Notice: Subject to any disclaimer, the term of this patent is extended or adjusted under 35 U.S.C. 154(b) by 1693 days.

(21) Appl. No.: 09/907,908

(22) Filed: Jul. 19, 2001

(65) Prior Publication Data
US 2002/0018552 A1 Feb. 14, 2002

(30) Foreign Application Priority Data
Aug. 10, 2000 (FR) .................................. 00 10528

(51) Int. Cl.
H04M 7/00 (2006.01)
G06F 15/173 (2006.01)

(52) U.S. Cl. .................. 379/219; 709/225; 709/226

(58) Field of Classification Search .............. 379/230, 379/252, 279, 219; 370/351, 255, 232, 237; 455/450, 404.1, 512, 445; 709/225, 226
See application file for complete search history.

(56) References Cited

U.S. PATENT DOCUMENTS

| | | | | |
|---|---|---|---|---|
| 3,649,767 A * | 3/1972 | Muroga et al. | .............. 379/279 |
| 5,170,393 A * | 12/1992 | Peterson et al. | ............. 370/255 |
| 5,315,586 A * | 5/1994 | Charvillat | .................... 370/232 |
| 5,425,019 A * | 6/1995 | Chugo et al. | ................. 370/237 |
| 5,745,694 A * | 4/1998 | Egawa et al. | ................. 709/225 |
| 5,862,485 A * | 1/1999 | Linneweh et al. | ........... 455/450 |
| 5,926,537 A * | 7/1999 | Birze | ......................... 379/252 |
| 5,933,485 A | 8/1999 | Chang et al. | ........... 379/210.01 |
| 6,161,016 A * | 12/2000 | Yarwood | .................... 455/445 |
| 6,282,429 B1 * | 8/2001 | Baiyor et al. | ................ 455/512 |
| 6,560,218 B2 * | 5/2003 | McAllister et al. | .......... 370/351 |
| 6,584,190 B1 * | 6/2003 | Bressler | ...................... 379/230 |
| 6,600,914 B2 * | 7/2003 | Uhlik et al. | .............. 455/404.1 |

* cited by examiner

Primary Examiner—Thjuan K Addy
(74) Attorney, Agent, or Firm—Sughrue Mion, PLLC

(57) ABSTRACT

In a system of the type in which for call setup each circuit segment is selected from available circuit segments, at least one circuit segment is permanently reserved on each trunk between nodes needed to set up circuits for particular calls to or from preferred users, and circuit segments are dynamically allocated from the reserved segments for setting up a circuit from the terminal of one user who has a preferred user attribute for particular calls in the event of a call set-up request by one of the users in respect of a call for which he has been granted a preferred user attribute.

12 Claims, 1 Drawing Sheet

METHOD OF PROVIDING THE FACILITY FOR SOME COMMUNICATION NETWORK USERS TO HAVE PREFERENTIAL ACCESS FOR PARTICULAR CALLS

CROSS-REFERENCE TO RELATED APPLICATIONS

This application is based on French Patent Application No. 00 10 528 filed Aug. 10, 2000, the disclosure of which is hereby incorporated by reference thereto in its entirety, and the priority of which is hereby claimed under 35 U.S.C. §119.

BACKGROUND OF THE INVENTION

1. Field of the Invention

The invention relates to a method of providing the facility for some users of a communication network to have preferential access for particular calls.

2. Description of the Prior Art

For various reasons, some users of a communication network are granted priority access for one or more particular calls, so that these preferred subscribers can obtain said calls under the best possible conditions, in particular if the traffic handled by the network corresponds to a load such that obtaining such calls in the normal way could not otherwise be guaranteed.

A prior art solution to ensuring high availability of a communication network for this kind of user is to allocate them circuits permanently, a pair of preferred users having a circuit reserved for them at all times on trunks between network switching nodes which are "borrowed" to interconnect the users concerned. Each circuit is constituted on a path or one of the available paths between the switching nodes to which the users concerned are connected. That path consists either of a reserved segment chosen from the segments that coexist on a trunk or of a plurality of reserved segments, each of which is chosen from one of the trunks via which the chosen path is set up, and which are connected in series by switching nodes of the network at which the trunks including the chosen segments terminate. Permanently reserving a circuit is a costly solution and is generally used only for a limited number of pairs of preferred users of a given network. It is less than the optimum, in particular when the circuits reserved for the preferred users are not being used by them and the traffic relating to other users is strongly retarded by the level of occupation of a trunk including the reserved segments.

Another prior art solution avoids the drawback of permanently reserving circuits for preferred users. It consists in the facility to cut off a call set up between users who are not preferred users if the conditions are such that there is no other way to set up a circuit enabling preferred users to communicate with each other. This solution represents a significantly lower penalty if the capacity of the network is sufficiently high to carry the traffic under good conditions and recourse to the pre-emptive rights of preferred users does not normally have to be used, and can therefore be considered as a last resort in the event of a problem. This solution is not satisfactory, however, if the pre-emptive right needs to be exercised, as this entails interrupting a call between users who have not requested this.

SUMMARY OF THE INVENTION

The invention therefore proposes a method of providing the preferential facility of obtaining particular calls between users manner by reserving circuit segments for some users of a communication network in the event that the particular calls are established via at least two switching nodes of the network, in the context of a network constituted so that each call requested by a user via a terminal is set up via a circuit for connecting the terminal to the terminal of a called user, the circuits comprising one circuit segment or a plurality of circuit segments connected in series, when the call is set up via a plurality of switching nodes of the network, each segment being selected from available circuit segments on a trunk between two switching nodes so that a circuit is set up enabling the calling user and the called user to communicate, which method includes the following operations:

permanently reserving at least one circuit segment on each trunk between nodes needed to set up circuits for each of the particular calls between users for which a preferred user attribute has been granted to at least one particular user of the two users concerned, and dynamically allocating circuit segments selected from the reserved segments and needed to set up a circuit from the terminal of one user who has a preferred user attribute for particular calls in the event of a call set-up request by one of the users in respect of a call for which he has been granted a preferred user attribute.

In one embodiment of the method defined above a referred user attribute is assigned to each user and corresponds to a particular category indication in the case of preferred users included in the calling user identifier that is transmitted for setting up a circuit at the time of a call request.

In accordance with the invention, a minimum-cost algorithm is used to choose a circuit at the time of a call request gives priority to choosing the shortest circuit set up via one or more reserved circuit segments in series when the request emanates from a user who has a preferred user attribute relating to the call requested and uses an unreserved circuit segment of a trunk if no reserved segments of said trunk are available and said trunk has at least one unreserved segment available at the time.

The invention also provides a communication network including switching nodes with point-to-point connections provided by trunks enabling users to communicate who have communication terminals each individually connected to one of said nodes, each call being obtained by means of a circuit set up between the nodes of users connected by a circuit segment in each trunk used, which communication network includes hardware and/or software for implementing a method as defined above.

The invention, its features and its advantages are explained in the following description, which is given with reference to the figures referred to below.

DETAILED DESCRIPTION OF THE PREFERRED EMBODIMENT

Figure 2:
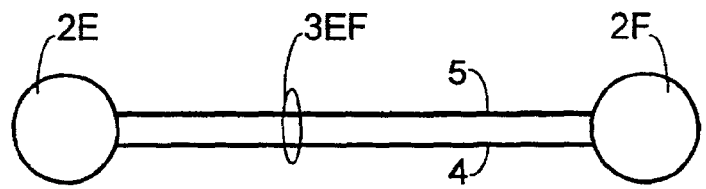
FIG. 2 is a diagram relating to a trunk linking nodes.

The method according to the invention is intended to be used in a communication network which enables network users to communicate with each other via communication terminals, for example the terminals 1A, 1B, 1C, 1D and 1E in FIG. 2, that enable each user to set up a circuit connecting them to a terminal of another user for a call. If setting up the circuit entails using at least two switching nodes of the network, such as the nodes 2E, 2F, 2G, the circuit for connecting a calling user to a called user can be made up of one circuit segment or several circuit segments connected in series along a path linking them across the network. This is known in the art. A switching node selectively connects user terminals and/or circuit segments between them. This is known in the art.

The point-to-point connections between the switching nodes are provided by trunks such as the trunks 3EF, 3FG and 3GE. Each trunk can set up a plurality of co-existing circuit segments in parallel between the switching nodes at which it terminates.

At each of the switching nodes at which it terminates, each circuit segment can be connected in series either with another circuit segment of an artery other than its own or with a user terminal. The respective terminals of the two users are connected via one of the units that enable a circuit to be set up.

Figure 1:
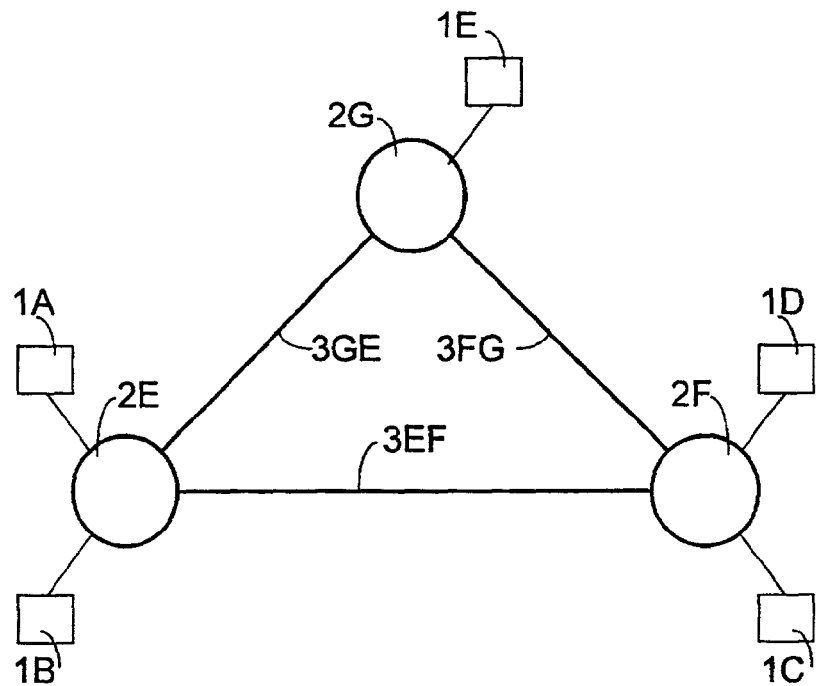
FIG. 1 is a diagram relating to a communication network.

In the example shown in FIG. 1, the communication network includes three switching nodes connected in pairs by the trunks referred to above. Some users have a preferential call set-up facility, compared to other users of the network, in particular if the traffic carried by one of the trunks to be used is at a level such that the connection would not necessarily be set up immediately if the calling user were not a preferred user.

As mentioned above, if a calling user and a called user are not connected to the same network switching center, a circuit is set up between a communication terminal of the calling user, for example the terminal 1A, and a communication terminal of the called user, for example the terminal 1E, via at least one circuit segment. In the case of the terminals 1A and 1E envisaged above, a circuit can be set up either via a circuit segment of the trunk 3GE using the switching nodes 2E and 2G to which the terminals are respectively connected or via two circuit segments that are connected in series by the switching node 2F and one of which was selected at the trunk 3EF linking the nodes 2E and 2F and the other at the trunk 3FG linking the nodes 2F, 2G. One or the other of the paths that correspond to these two possible circuits between the terminal 1A and the terminal 1E is conventionally chosen allowing for particular selection factors and in particular the respective costs of setting up a call on each of the feasible paths, if there is a choice. This is known in the art. This kind of choice can be envisaged only if the traffic handled by the respective trunks concerned does not reach a level of occupancy leading to temporary unavailability for setting up a new call of all the circuits of one of the trunks.

Situations can arise in which it is temporarily no longer possible for a user to enter into communication with another user because the trunks that can be used to connect them no longer enable a circuit to be set up between them because there are no available circuit segments over a portion of the path or each of the paths that can be used to set up the call.

This has led to the prior art solution, referred to above, whereby a circuit between two users is permanently reserved, whether they are in communication or not, so that the users can communicate as soon as they want to, provided that each of them is in a position to respond to a request from the other.

The invention provides a facility of obtaining at least one particular call between two users, via their respective communication terminals, in a preferential manner for at least one of the two users.

To this end, a circuit segment is permanently reserved on each of the trunks connecting nodes needed to set up circuits for each of the particular calls between users when at least one of the two users concerned is a preferred user. Each trunk, for example the trunk 3EF, is then organized so that the resources that it offers in terms of parallel circuit segments between the switching nodes 2E and 2F at which it terminates are divided into two. In the present example one part, symbolized by a link 4 in FIG. 2, consists of "m" of the "n" segments provided on the trunk 3EF. It is made up of segments that can be used only by users granted the privilege of being able to set up a predetermined call the circuit for which implies the use of a segment of the trunk 3EF. Other users share the "n-m" segments of the trunk 3EF which are not reserved for preferred users, the part including these "n-m" segments being symbolized by a link 5 in FIG. 2. The numbers n and m are assumed to be positive integers; "n" is equal to 30, for example; "m" is usually very much less than "n".

One embodiment of the method according to the invention therefore assigns a particular category indication containing a preferred user attribute to the various users of a communication network so that users whose referred user attribute reflects the fact that they have been assigned priority for obtaining a circuit for setting up a particular call can be differentiated from users to whom that priority has not been assigned. This attribute is associated with the identifier of the calling user that is transmitted along the path for connecting the switching node to which the calling user is connected to the switching node to which the called user is connected at the time of setting up the circuit enabling them to communicate.

Figure 3:
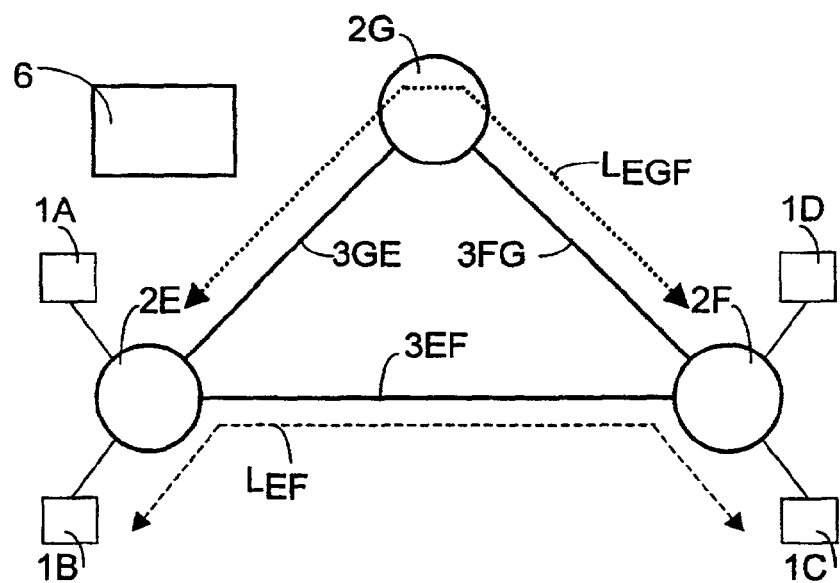
FIG. 3 is a diagram showing various circuit possibilities in the context of the network shown in FIG. 1.

The circuit is set up by a logical routing system of the communication network, represented by a programmed logic unit 6 in FIG. 3. This is known in the art. The logic unit can take various forms, for example one or more centralized and/or distributed processor units of the network, in particular processor units distributed to the switching nodes.

Setting up a circuit from a user for a call employs a metric taking account of the available resources. In the case of a user requesting a call for which he does not have the referred user attribute, only resources for which no priority has been assigned are taken into account. This applies, for example, to a user of a terminal 1A connected to a switching node 2E seeking to set up a call with another user of a terminal 1D if the two users have no preferred user attribute for the call concerned.

The logic unit 6 then determines, in accordance with its programming, which path for setting up a circuit between the users 1A and 1D using the resources for which no preferred user attribute has been assigned has the lowest cost. In this example, the choice is between the circuit consisting of a trunk element 3EF which is available and which is not reserved for preferred users and a circuit consisting of the series connection of a trunk element 3GE and a trunk element 3FG which are both available and not reserved for preferred users.

According to the invention, the logic unit 6 is additionally programmed to determine by means of an algorithm the lowest-cost path for circuit set-up requests from a user wishing to set up a particular call for which he has previously been granted a preferred user attribute.

That cost $C_{res}$ can be represented as a function of reserved resources $R_r$ and normal resources $R_n$ by the following equation:

$$C_{res} = MIN\{F(R_r), F(R_n)\}$$

in which F is a decreasing function and the function MIN gives preference to paths which are shorter, in terms of the number of nodes crossed.

The cost $C_{res}$ is calculated in the case of a user having a terminal, such as the terminal 1B, via which he is connected to a predetermined user of a predetermined terminal 1D, which has a preferred user attribute relating to a predetermined call, for example.

In FIG. 3, the terminal 1B and the terminal 1D can be connected by a circuit consisting either of a single hop comprising one circuit segment specific to the trunk 3EF, as symbolized by the link $L_{EF}$, or of two hops comprising two segments, one of which is a segment of the trunk 3GE and the other of which is a segment of the trunk 3FG; the two segments are connected in series via the node 2G, as symbolized by the link $L_{EGF}$.

The choice between the available paths between the terminals 1B and 1D for a call by a given user initially involves determining if that user has a preferred user attribute allowing him to set up a circuit using segments reserved to preferred users for the call requested.

If so, the cost algorithm gives priority to searching for the path with the least hops and therefore circuit segments in series between the nodes to which the calling user and the called user are respectively connected, preferably using circuit segments reserved to preferred users, if the calling user is a preferred user and if he is setting up a call for which he has a preferred user attribute on record. For example, if the user of the terminal 1B attempts to set up a call with the user of the terminal 1D, for which call he has a preferred user attribute, the chosen path is set up via a reserved circuit segment of the trunk 3EF, if there is any such segment available on that trunk. The path is set up via an unreserved circuit segment of the same trunk if no reserved segments are available but unreserved circuit segments are available at the time. The processing capabilities of the network are used in the event of saturation of a trunk for all users if a preferred user is faced with a saturation situation on the occasion of a call request.

The method according to the invention therefore organizes and manages dynamically a set of reserved circuit segments on various trunks as a function of requests from users having particular preferred user attributes on record in the network, for example in the unit processing routing in their respective connection nodes. It propagates referred user attributes assigned to the various users in call set-up messages originating from those users.

There is claimed:

1. A method of providing preferential access for particular point-to-point calls between preferred users of a communication network wherein said particular calls are established via circuits between switching nodes, said circuits comprising one circuit segment or a plurality of circuit segments connected in series, wherein for call setup each segment is selected from available circuit segments on a trunk between two switching nodes so that a circuit is set up enabling the calling user and the called user to communicate, which method includes the steps of:
   permanently reserving at least one circuit segment on each trunk between switching nodes needed to set up circuits for said particular point-to-point calls between users at least one of whom is a preferred user, a permanently reserved circuit segment being available only for said particular calls between users at least one of whom is a preferred user and not available for calls between users of said network neither of whom is a preferred user, and
   dynamically allocating circuit segments selected from said reserved segments and needed to set up a circuit from a preferred user in the event of a call set-up request by said preferred user.

2. The method claimed in claim 1 wherein a user attribute is assigned to each user and corresponds to a particular category indication in the case of preferred users included in the calling user identifier that is transmitted for setting up a circuit at the time of a call request.

3. The method claimed in claim 1 wherein a minimum-cost algorithm used to choose a circuit at the time of a call request gives priority to choosing the shortest circuit set up via one or more reserved circuit segments in series when the request emanates from a user who has a preferred user attribute relating to the call requested and uses an unreserved circuit segment of a trunk if no reserved segments of said trunk are available and said trunk has at least one unreserved segment available at the time.

4. The method claimed in claim 1 wherein processing capabilities of the network are used for all users in the event of saturation of a trunk concerning a call for which a user has a preferred user attribute.

5. A communication network including switching nodes with point-to-point connections provided by trunks enabling users to communicate who have communication terminals each individually connected to one of said nodes, each call being obtained by means of a circuit set up between the nodes of users connected by a circuit segment in each trunk used, which communication network includes hardware and/or software for implementing a method of providing preferential access for particular point-to-point calls between preferred users of a communication network wherein said particular calls are established via circuits between switching nodes, said circuits comprising one circuit segment or a plurality of circuit segments connected in series, wherein for call setup each segment is selected from available circuit segments on a trunk between two switching nodes so that a circuit is set up enabling the calling user and the called user to communicate, which network includes:
   at least one permanently reserved circuit segment on each trunk between switching nodes needed to set up circuits for said particular calls between users at least one of whom is a preferred user, a permanently reserved circuit segment being available only for said particular point-to-point calls between users at least one of whom is a preferred user and not available for point-to-point calls between users of said network neither of whom is a preferred user, and
   at least one of hardware and software which dynamically allocates circuit segments selected from said reserved segments and needed to set up a circuit from a preferred user in the event of a call set-up request by said preferred user.

6. The network claimed in claim 5 wherein a preferred user attribute is assigned to each user and corresponds to a particular category indication in the case of preferred users included in the calling user identifier that is transmitted for setting up a circuit at the time of a call request.

7. The network claimed in claim 5 wherein a minimum-cost algorithm used to choose a circuit at the time of a call request gives priority to choosing the shortest circuit set up via one or more reserved circuit segments in series when the request emanates from a user who has a preferred user attribute relating to the call requested and uses an unreserved circuit segment of a trunk if no reserved segments of said trunk are available and said trunk has at least one unreserved segment available at the time.

8. The network claimed in claim 5 wherein processing capabilities of the network are used for all users in the event of saturation of a trunk concerning a call for which a user has a preferred user attribute.

9. A method of providing preferred access for particular point-to-point calls between users of a network, said network including at least two switching nodes and a plurality of circuit segments connected between said two switching nodes, said method comprising the steps of:

permanently reserving a subset of said circuit segments such that reserved and unreserved segments are provided between said two switching nodes;

according preferred status to a subset of users of said network; and providing access to said reserved segments only for point-to-point calls involving a user having preferred status and not for calls involving users of said network neither of whom has said preferred status.

10. A method of sharing capacity amongst users of a network, said network including at least two switching nodes and a plurality of circuit segments connected between said two switching nodes, said method comprising the steps of:

dividing said plurality of circuit segments into first and second segments;

according preferred status to a subset of users of said network which is less than all of the users of said network; and for point-to-point calls involving a user having said preferred status, providing higher priority access to said first segments than to said second segments, and wherein said first segments are only available to point-to-point calls involving a user having said preferred status.

11. A communications network including at least two switching nodes and a plurality of circuit segments connected between said two switching nodes, wherein said plurality of circuit segments include first and second segments with a point-to-point call involving a user having preferred status having higher priority access to said first segments than to said second segments; and said network includes at least one of hardware and software which dynamically allocates said first segments only amongst point-to-point calls involving users of said network having said preferred status, wherein said first segments are only available to calls involving a user having said preferred status and are not available to calls involving a user not having said preferred status.

12. A method according to claim 9, wherein said user has a higher priority access to said reserved segments and has a lower priority access to said unreserved segment.

\* \* \* \* \*